United States Patent [19]

Lovell et al.

[11] 4,131,667

[45] Dec. 26, 1978

[54] PREPARATION OF POLYURETHANE COMPOSITE MOLD BY INJECTION MOLDING

[75] Inventors: John A. Lovell, Monroe Falls; Donald V. Hillegass, Alliance, both of Ohio; Philip G. Harris, Clemson, S.C.

[73] Assignee: The Goodyear Tire & Rubber Company, Akron, Ohio

[21] Appl. No.: 684,132

[22] Filed: May 7, 1976

Related U.S. Application Data

[63] Continuation of Ser. No. 508,362, Sep. 23, 1974, abandoned.

[51] Int. Cl.² .......................... B29C 1/02; B29G 3/00
[52] U.S. Cl. .................................... 264/571; 264/102; 264/225; 264/337; 264/338; 264/DIG. 77
[58] Field of Search ............... 264/219, 225, 331, 337, 264/338, 102, 90, DIG. 77

[56] References Cited

U.S. PATENT DOCUMENTS

| | | | |
|---|---|---|---|
| 1,991,009 | 2/1935 | Bronne et al. | 264/225 |
| 3,059,278 | 10/1962 | Daniel | 264/102 |
| 3,253,303 | 5/1966 | Brandt | 264/329 |
| 3,428,725 | 2/1969 | Delmonte et al. | 264/226 |
| 3,504,079 | 3/1970 | Hall | 264/227 |
| 3,546,148 | 12/1970 | Diamond et al. | 260/77.5 AP |

*Primary Examiner*—James B. Lowe
*Attorney, Agent, or Firm*—H. C. Young, Jr.

[57] ABSTRACT

Method of preparing polyurethane composite mold by injecting a composite reaction mixture onto a master form in a mold cavity, curing said reaction composite and removing it from the master form in a step-wise process involving a pressure manipulation. Said composite comprises 100 parts by weight inorganic water insoluble inert granular material and about 50 to about 200 parts by weight liquid polyurethane reaction mixture substantially free of volatile solvents.

2 Claims, No Drawings

PREPARATION OF POLYURETHANE COMPOSITE MOLD BY INJECTION MOLDING

This is a continuation of application Ser. No. 508,362 filed Sept. 23, 1974, now abandoned.

This invention relates to an improved mold for preparing molded articles and particularly to a method of preparing such a mold.

Molded articles have been prepared by depositing materials on contoured mold surfaces and removing the shaped or molded articles. For example, contoured padded elements such as seat cushions, bumpers, crash pads and upholstery for automobiles have been prepared which have thermoplastic shells or skins adhered to resilient foam pads or cores. Such padded elements have been prepared, for example, by first forming skins of a polymeric material on a mold surface followed by the application of a polymeric foam material within the shell or the skin or between such a skin and a backing or mounting plate. Heretofore, however, intricately shaped padded elements when formed by such a method have many times been difficult to remove from the mold itself without an attendant danger of tearing or destroying a part of the mold or shaped article itself.

A solution to such a problem can be the preparation of the article within a mold which consists of several parts which are broken apart after the molding operation. However, the resulting article itself typically has resultant mold parting lines on its exterior surface which are not commercially attractive. Another solution to the problem can be the use of a flexible mold. Attendant problems with a flexible mold typically include a tearing of the mold surface itself after a multiple of molding steps have been performed. Preparation of such a mold itself can be troublesome because of a typical shrinkage factor resulting from its normal preparation from a solvent solution.

It is, therefore, an object of this invention to provide an improved mold for preparing molded articles, and particularly to provide a method of preparing such a mold.

In accordance with this invention, it has been discovered that a flexible mold for preparing molded articles can be formed by the method which comprises applying a composite reaction mixture to a master form, curing said reaction composite, and removing it from said master form, where said composite reaction mixture comprises 100 parts by weight of an inorganic water insoluble inert granular material of an average specific gravity of greater than one with a particle size in the range of about 25 to about 500 mesh and about 50 to about 200 parts by weight of a liquid polyurethane reaction mixture substantially free of volatile solvent which comprises an organic polyisocyanate having an isocyanato content of 2 to 3 and a liquid polymeric reactive hydrogen-containing material having a molecular weight in the range of about 700 to about 5,000, so long as it is liquid, selected from polyester polyols, polyether polyols and hydroxyl terminated polymers of conjugated diene hydrocarbons having a hydroxyl functionality of from 2 to about 3 and where the ratio in the polyurethane reaction mixture of isocyanato groups to hydroxyl groups of the liquid polymeric reactive hydrogen-containing materials is in the range of from about 0.6/1 to about 3/1.

In the practice of this invention, a master form is generally obtained. Such a master form is a representation of the shape and surface definition for which it is desired that a molded article assume. Such a form can be of any material over which the reaction composite can be cast and cured. For example, such materials can be of plaster, wood, metal, as well as thermoplastic and thermoset materials, and the like. The surface definition of such a form is the actual appearance of the form's surface itself. Thus, a surface definition or representation might be leather-like, granular, textile fabric or other texture.

In this invention, the reaction composite is applied to such a master form, generally by casting or by injection molding, and then cured, to form a mold which has a contour and surface complimenting the master form. After removal from the master form, the cured composite can be used for molding various articles from various polymeric materials. It can be used as a mold itself or it can be used as a partial or whole liner for a major mold of many parts or a supporting substrate. It is usually desired that a release agent such as a wax, be applied to the mold surface before molding articles thereon to facilitate easier removal of such articles. Various materials can be molded on the prepared mold surface. Representative of such materials are thermoplastic polymeric materials such as polyurethanes.

It is a particularly advantageous feature of this invention that the mold itself can be prepared by injection molding. This feature is particularly and uniquely advantageous to this invention when utilizing the required reaction composite. The minimization of the composite shrinking on the master form as well as minimization of bubble formation when utilizing the required substantially solvent-free composite is especially advantageous. If it is desired that the mold be formed by injection molding, generally the master form is positioned so that it is a part of a cavity to which a reduced pressure is first applied followed by injection of the reaction composite to the cavity while maintaining the reduced pressure and then followed by applying greater than atmospheric pressure to the essentially filled cavity and curing said reaction composite. For such purpose, a reduced pressure in the range of about 200 to about 760 millimeters of mercury and a pressure of about 0.5 to about 50 pounds per square inch above atmospheric is satisfactory.

The inorganic granular materials for the composite are required to be substantially inert or non-reactive with the polyurethane reaction mixture, essentially water insoluble and to have an average specific gravity of greater than one or, more desirably, in the range of about 1.2 to about 6, preferably about 2 to about 4. They are generally preferred to have a particle size of from about 25 to about 500 and more preferably from about 100 to about 400 U.S. Standard mesh size. Representative examples of such granular materials are those selected from silicates, particularly aluminum silicates such as clay, calcium carbonate such as chalk and whiting, aluminum hydrate, zinc oxide, titanium dioxide, feldspar and various barytes.

The polyurethane binders for the composite are required to be prepared from polyurethane reaction mixtures which are liquid at typical preparation application temperatures, such as about 25° C. to about 30° C. They should be characterized by being sufficiently fluid at about 30° C. and preferably at about 25° C., to be easily sprayable by ordinary spray techniques. Because these liquids are expected to be non-Newtonian by nature, their sprayability is related to both viscosity and applied shear rates at these temperatures. Generally their sprayability should be equivalent to a Newtonian fluid having a viscosity in the range of about 2000 to about 1,000,000 centipoises at about 25° C. The reaction mixtures are further required to be substantially free of volatile solvents, that is, solvent having boiling points at atmospheric pressure below about 200° C. and preferably below about 85° C. that are essentially non-reactive with the reaction mixture. Solvents boiling above about 200° C. such as processing oils or waxes are considered herein more of a non-volatile type and in the nature of extenders. Thus, the reaction mixture is required to contain less than about 5 and preferably less than about 2 weight percent of the volatile solvent based on the polyurethane reaction mixture. Of course, it is preferred that the reaction mixture is essentially free of water, where it is desired to produce essentially non-cellular or solid composites.

Representative examples of the various volatile organic solvents which are essentially non-reactive with the polyurethane reaction mixture and of which the reaction is to substantially free include benzene, toluene, liquid ketones, such as acetate, methyl ethyl ketone, diethyl ketone, methyl isoamyl ketone, diisobutyl ketone and chlorinated hydrocarbon solvents, such as trichloroethylene, methylene chloride, etc. The small amount of volatile solvent can be mixed with the polyurethane reaction mixture where it may be desirable to reduce its viscosity somewhat for spraying applications.

If desired, the flexible composite comprising the inorganic granular material and the flexible polyurethane binder therefor can be extended with up to about 10 parts and preferably from about 2 to about 5 parts by weight of an extender oil or wax based on the liquid polyurethane reaction mixture and having a boiling point of at least about 200° C. so long as the resulting composition has the required tensile strength and elongation and so long as the oil or wax does not unnecessarily interfere with the operation of the prepared mold itself. In the practice of this invention, the extender oil or wax is typically introduced into the composition by mixing it with one of the reactants of the polyurethane reaction mixture before it is applied.

The extender oils are those generally known in the art as rubber processing oils, rubber extending oils or compatible rubber processing oils. These terms are used to refer to oils that are miscible with the flexible cured polyurethane and do not excessively migrate to its surface.

The extender oils or rubber processing oils are normally derived from petroleum although they can also be derived from coal tar and other sources such as rosin oils. Representative processing oils are more fully described in U.S. Pat. No. 3,081,276. The processing oils are usually composed primarily of paraffinic hydrocarbons, naphthenic hydrocarbons and aromatic hydrocarbons. Such oils are well-known commercial oils normally used in rubber compounding which are generally high-boiling petroleum fractions obtained after gasoline, fuel oil and other lower boiling materials are removed by distillation. They normally have a viscosity of from about 10 centipoises at 100° C. up to semi-solid materials softening at about 40° C. to about 90° C. They usually have a boiling point of at least about 200° C. and higher. For example, many processing oils have a boiling point of at least about 245° C. at 10 millimeters of mercury. They normally have a specific gravity (60/60° F.) of from about 0.9 to about 1.05.

The waxes are those generally known in the art as rubber process aids or ozone inhibitors for rubber. The waxes are normally derived from petroleum in much the same fashion as the extender oils except they are always solid at room temperature and melt in the range of 50° C. to 200° C. They are typically referred to as paraffin waxes.

The liquid polyurethane reaction mixtures used in the practice of this invention are typically prepared from liquid reactive hydrogen-containing polymeric materials, an organic polyisocyanate and, if desired, curatives selected from hydrocarbon diols and diamines having primary and secondary amino groups, preferably primary amino groups. It is to be understood that the polyurethanes referred to in this specification may also contain polyurea linkages. The liquid reactive hydrogen-containing polymeric material used is preferably liquid and sprayable at about 25° C. and comprises at least one member selected from the group consisting of materials having a molecular weight from about 700 to about 5000 and preferably from about 1000 to about 3000 selected from polyester polyols, polyether polyols and hydroxyl terminated polymers of conjugated diene hydrocarbons having a hydroxyl functionality of from about 2 to about 3 and preferably from about 2.1 to about 2.5. Generally the polyether polyols and hydroxyl terminated diene hydrocarbon polymers are the preferred active hydrogen-containing material where high strength and solvent resistance are desired.

The hydroxyl terminated polymers and copolymers of the diene hydrocarbons are typically polymers of 1,3-conjugated diene hydrocarbons having 4 to 6 carbon atoms and copolymers thereof with compounds selected from styrene, acrylonitrile and ethyl acrylate. Representative of the polymers are liquid hydroxyl terminated polymers of 1,3-butadiene, polymers of isoprene, their copolymers, copolymers of 1,3-butadiene and styrene, copolymers of 1,3-butadiene and acrylonitrile, copolymers of 1,3-butadiene and ethyl acrylate and copolymers of 1,3-butadiene and chloro-1,3-butadiene. Particularly useful polyols are those of polybutadiene, polyisoprene, and copolymers of butadiene-isoprene, butadiene-styrene. The required polyols typically have a viscosity at about 30° C. of from about 10 poise to about 150 poise and more generally from about 20 poise to about 100 poise.

The required liquid polyester polyols typically have a hydroxyl functionality of about 2 with an equivalent weight of from about 200 to about 1000 with a structure of the type obtained from dicarboxylic acids having from 4 to 10 carbon atoms and hydroxyl terminated hydrocarbon diols having from 2 to 8 carbon atoms.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

The liquid polyether polyols typically have a hydroxyl functionality of at least 2 and preferably 2 to 3, a molecular weight of about 500 to about 3500 and preferably 500 to 2000, a viscosity at about 30° C. of from about 50 to about 200 centipoises and have the general structure of those prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylenearyl ether glycols or triols, polytetramethylene ether glycols, polyalkylene ether-thioether glycols or triols, and alkyd resins. Generally, the propylene ether glycols are the preferred polyether glycols.

The organic polyisocyanates used to prepare the polyurethanes include various polyisocyanates having an isocyanato group content of from 2 to about 3 and particularly the organic diisocyanates. Generally the organic diisocyanates and dimers and trimers thereof are preferred. The organic polyisocyanates can be aromatic, aliphatic or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis (cyclohexylisocyanate), isophorone diisocyanate, such as 3-isocyanato methyl-3.5.5-trimethyl cyclohexyl isocyanate, 1,5-tetrahydronaphthalene diisocyanate and polymers, such as dimers and trimers of such diisocyanates. For the purpose of the present invention, the toluene-diisocyanates, diphenylmethane-4,4'-diisocyanate, isophorone diisocyanate, 3,3'-dimethyl-4,4'-bisphenylene diisocyanate and their polymers such as dimers and trimers are generally preferred although the diisocyanates having isocyanato groups connected to nonbenzenoid carbon atoms are preferred where color retention is important.

The polyurethane binder for the composite of this invention can typically be prepared by forming a liquid polyurethane reaction mixture by (A) reacting a reactive hydrogen-containing polymeric material, usually required to be a polymeric polyol, with a polyisocyanate to form an isocyanate terminated polyurethane sometimes called a prepolymer which is then mixed with a diamine or a hydrocarbon diol, if a curative is desired, or (B) the mixture can be formed by the well known one-shot method. For the first method, the prepolymer is typically prepared by reacting the reactants in proportions such that the ratio of isocyanato groups to the reactive hydrogen-containing groups (hydroxyl groups) of the reactive hydrogen-containing polymeric material is from about 1.1/1 to about 12/1 and preferably about 1.5/1 to about 4.0/1, although for the one-shot method, the ratio is typically in the range of about 0.6/1 to about 3/1, preferably about 0.8/1 to about 2/1. These materials are generally reacted at temperatures from about 20° C. to about 150° C. and cured to form the polyurethane polymer.

If the one-shot method is used, the polymeric polyol, polyisocyanate and other curatives, such as the diamines or diol if used, are simply mixed together with the granular material and allowed to cure. When the polymeric polyols or their mixtures have a hydroxyl functionality greater than 2, such as about 2.2 to about 3, the other curatives are not normally needed. If the prepolymer method is used, the diamine or hydrocarbon diol curative is mixed with the prepolymer to form a reactive mixture and applied with the granular material.

The diamine or diol curative, when desired, is used in a ratio of from about 0.5/1 to about 1.5/1 and preferably from about 0.8/1 to about 1.0/1 amino groups of the diamine or hydroxyl groups of the diol for each isocyanato group in excess of the reactive hydrogen groups of the reactive hydrogen-containing polymeric material. The mixture is typically mixed with the curative at a temperature of from about 20° C. to about 50° C. and the resulting mixture then typically cured at a temperature of from about 20° C. to about 150° C.

Representative of the various typical hydrocarbon diol curatives are ethylene glycol, 1,3-propane diol, 1,4-butane diol and glycerol, although others can be used. It is preferred that they are liquid at about 30° C.

Representative of various diamine curatives include aliphatic and aromatic diamines having primary amino groups and include compounds referred to in this specification as substituted methyl amine compounds.

Representative of the substituted methyl amine compounds are those having the structure of the formula (1):

wherein $R_1$, $R_2$ and $R_3$ are individually selected from the group consisting of (a) hydrogen radicals, alkyl, cycloalkyl, aryl, alkaryl, and aralkyl radicals. Representative of such radicals are alkyl radicals having from one to forty carbon atoms such as methyl, ethyl, propyl, isopropyl, butyl, isobutyl, amyl, isoamyl, hexyl, isohexyl, heptyl, octyl, duodecyl and tetracontyl radicals; cycloalkyl radicals such as cyclobutane, cyclopentane, cyclohexane, cycloheptane and cyclooctane; aryl radicals such as phenyl and naphthyl radicals; alkaryl radicals such as tolyl and xylyl radicals, and aralkyl radicals such as benzyl radicals; and (b) substituted alkyl, cycloalkyl, aryl, alkaryl and aralkyl radicals where the substituents are selected from at least one of the group consisting of nitrogen, hydrogen, carbon, oxygen, sulfur, fluorine, chlorine, bromine, iodine and phosphorous. Representative examples of such substituted radicals are amino radicals, imino radicals, and radicals containing amino groups, imino groups, halo groups, ether groups and thioether groups.

Particularly representative substituted methyl amines are primary diamines having their amino groups attached to non-benzenoid carbon atoms.

Further representative examples of the said substituted methyl amino compounds are compounds prepared by the method which comprises reacting the substituted methyl amine compound of formula (1) with an aldehyde or ketone. Various aldehydes can be used, representative of which are formaldehyde, acetaldehyde, propionaldehyde and benzylaldehyde. Various ketones can be used representative of which are acetone, methyl ethyl ketone, methyl isobutyl ketone, diisobutyl ketone, methyl n-amyl ketone, methyl-i-amyl ketone and acetophenone. These compounds are generally called aldimines and ketimines.

Representative examples of the various diamines, including the substituted methyl amine compounds, are ethylene diamine, trimethylene diamine, tetramethylene diamine, hexamethylene diamine and dimethyl hexamethylene diamine; isophorone diamine including 3-amino methyl-3.5.5-trimethyl cyclohexyl amine, 1,4-cyclohexane bis methyl amine, 4,4'-diamino-dicyclohexyl methane, meta xylene diamine, paraxylene diamine, tetrachloroparaxylene diamine, cyclobutane-1,2-bis methylamine, menthane diamine, imino bis propylamine, bis(amino propyl) piperazine, diethylene triamine, triethylene tetramine, triethylene pentamine, o- and m-phenylene diamine, o- and m-dichlorobenzidine, 2,5-dichlorophenylene diamine, 3,3'-dichloro-4,4'-diamino diphenyl methane, the naphthylene diamines, tolylene 2,4-diamine, p-amino benzl aniline, and o- and p-amino diphenyl amine.

If desired, a catalyst can be used to increase the reaction rate between the reactive hydrogen containing material and the polyisocyanate. Suitable catalysts are the well known catalysts typically used for polyurethanes. Representative of the various catalysts are dibutyltin dilaurate, stannous octoate, magnesium oxide, butylaldehyde-butylamine condensation product, 2-mercaptobenzothiazole, cobalt naphthenate and tertiary amines such as triethylene diamine, methylated tetraethylene tetramine and hexamethylene tetramine. It has been found that the organotin compounds such as dibutyltin dilaurate and stannous octoate are quite useful in this regard.

The practice of this invention is further illustrated by reference to the following examples which are intended to be representative rather than restrictive of the scope of the invention.

EXAMPLE I

A contoured mold suitable for preparing an automobile dash mounted protective crash pad was prepared in the following way.

A master form, made of plastic, was obtained having the size, shape and contour required for an automobile crash pad and having a simulated leather grain surface definition. The overall shape of the master form, or desired crash pad, was generally rectangular having the general dimensions of 5 feet by 1 foot by 6 inches.

The master form was coated with a simple release wax over which was cast a reaction composite. The composite was cured at a temperature of about 80° C. for about 6½ hours to form a somewhat stiff but relatively easily flexed material. The cured composite had a general thickness of about ⅛ inch, although it was considerably thicker in various areas where the master form had deep contours. The cured composite was easily removed from the master form and was visually inspected and affirmatively determined to have excellent detail with an essentially duplicated, complimentary contoured, leather grained surface definition of the master form itself. Furthermore, the reaction composite, upon curing to form the corresponding crash pad mold, easily maintained its original shape without appreciable shrinking, thus enhancing its accurate complimentary duplication of both the master form's contour and its surface definition.

The prepared concave crash pad mold was coated with a suitable release wax. A simple polyurethane reaction mixture was cast on the mold surface and cured to form a crash pad shell having an average thickness of about 0.05 inch. To the concave shell, still in the mold, is applied a foamable polyurethane reaction mixture which is allowed to foam and cure at about 90° C. for about 1 hour. The crash pad shell with its foam inlay is then easily removed from the mold upon a small amount of manipulative flexing of the mold itself without tearing or damaging the mold or its surface definition.

For this example, the composite reaction mixture was prepared by first mixing 100 parts of mixture of zinc oxide, calcium carbonate and titanium dioxide pigment having about a 250 average mesh size and 143 parts of a polybutadiene polyol having a molecular weight of about 2900 and having a hydroxyl functionality of about 2.3. The pigment-polymer mixture was placed in a reactor and a reduced pressure applied for about 10 minutes at about 25° C. Diphenylene methane-4,4'-diisocyanate (15 parts) was added to the mixture to which a reduced pressure was again applied and mixing continued for about 5 to about 10 more minutes. Immediately after mixing, the reaction composite was cast onto the master mold. The master mold itself was of a plasticized polyvinyl chloride thermoplastic.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a flexible polyurethane mold which, in turn, can be used for preparing molded articles which comprises (A) positioning a master form so that it is a part of a cavity, (B) applying a reduced pressure to said cavity, (C) injecting a polyurethane reaction composite onto said master form in said cavity while maintaining a reduced pressure therein, (D) curing the mixture in said cavity under a pressure greater than atmospheric pressure to form a shaped article and (E) removing said article from said master form; where said composite reaction mixture contains less than about 5 weight percent of a volatile organic solvent and comprises 100 parts by weight of an inorganic water insoluble inert granular material of an average specific gravity of greater than one with a particle size in the range of about 25 to about 500 mesh and about 50 to about 200 parts by weight of a liquid polyurethane reaction mixture characterized by being non-Newtonian and having a sprayability equivalent to a Newtonian fluid having a viscosity in the range of about 2000 to about 1,000,000 centipoises at about 25° C., which consists essentially of (A) an organic polyisocyanate having an isocyanato content of 2 to 3 and (B) a liquid polymeric polyol having a molecular weight in the range of about 700 to about 5,000, so long as it is liquid, selected from at least one of polyester polyols, polyether polyols and hydroxyl terminated polymers of conjugated diene hydrocarbons having an average hydroxyl functionality of from 2 to about 3 and where the ratio isocyanato groups of the polyisocyanate to hydroxyl groups of the liquid polymeric polyol is in the range of from about 0.8/1 to about 2/1.

2. The method of claim 1 where said polyester polyols have a functionality of about 2 with an equivalent weight of about 200 to about 1,000 with a structure of the type obtained from the reaction of dicarboxylic acids having from 4 to 10 carbon atoms and hydroxyl terminated hydrocarbon diols having 2 to 8 carbon atoms which are the condensation products of low molecular weight glycols with an organic polycarboxylic acid or anhydride, where said polyether polyols have a hydroxyl functionality of 2 to 3, a molecular weight of about 700 to about 3500, a viscosity at 30° C. of about 50 to about 200 centipoises and have the general structure of those prepared by polymerizing or copolymerizing alkylene oxides, by polymerizing or copolymerizing low molecular weight glycols, or by the reaction of an alkylene oxide with low molecular weight glycols, and where said hydroxyl terminated polymers and copolymers of diene hydrocarbons are polymers of 1,3-conjugated diene hydrocarbons having 4 to 6 carbon atoms and copolymers thereof with compounds selected from styrene, acrylonitrile and ethyl acrylate.

* * * * *